United States Patent [19]

Huggins

[11] Patent Number: 4,849,624
[45] Date of Patent: Jul. 18, 1989

[54] OPTICAL WAVELENGTH DIVISION MULTIPLEXING OF DIGITAL ENCODER TRACKS

[75] Inventor: Raymond W. Huggins, Mercer Island, Wash.

[73] Assignee: The Boeing Company, Seattle, Wash.

[21] Appl. No.: 211,383

[22] Filed: Jun. 24, 1988

[51] Int. Cl.[4] .......................... G01J 3/50; H01J 3/14; G01D 5/34

[52] U.S. Cl. ........................... 250/226; 250/231 SE; 250/237 G; 341/13

[58] Field of Search ............. 250/237 G, 231 SE, 226; 341/13; 33/125 A, 125 C; 356/373, 374

[56] References Cited

U.S. PATENT DOCUMENTS

| | | | |
|---|---|---|---|
| 3,587,063 | 6/1971 | Lamberts et al. | 350/162.19 |
| 3,609,010 | 9/1971 | Mueller | 350/162.19 |
| 3,702,725 | 11/1972 | Macovski | 350/162.5 F |
| 3,703,640 | 11/1972 | Broussaud et al. | 370/3 |
| 3,929,398 | 12/1975 | Bates | 250/226 |
| 4,007,989 | 2/1977 | Wajda | 250/237 G |
| 4,111,524 | 9/1978 | Tomlinson III | 350/96.19 |
| 4,146,783 | 3/1979 | Desbois et al. | 350/162 R |
| 4,148,556 | 4/1979 | Sauter et al. | 350/96.19 |
| 4,153,330 | 5/1979 | Tomlinson III | 350/96.19 |
| 4,155,627 | 5/1979 | Gale et al. | 350/162 R |
| 4,198,117 | 4/1980 | Kobayashi | 350/96.19 |
| 4,211,918 | 7/1980 | Nyfeler et al. | 235/454 |
| 4,223,216 | 9/1980 | Quick et al. | 250/226 |
| 4,303,341 | 12/1981 | Kleinknecht et al. | 356/384 |
| 4,334,152 | 6/1982 | Dakin et al. | 250/226 |
| 4,362,359 | 12/1982 | Dammann et al. | 350/96.19 |
| 4,408,123 | 10/1983 | Sichling et al. | 250/226 |
| 4,441,181 | 4/1984 | Winzer et al. | 370/3 |
| 4,470,688 | 4/1988 | Edwards | 250/226 |
| 4,517,456 | 5/1985 | Halsall et al. | 250/226 |
| 4,528,448 | 7/1985 | Doggett | 250/237 G |
| 4,546,466 | 10/1985 | Lopiccolo | 370/3 |
| 4,622,663 | 11/1986 | Ishikawa et al. | 370/3 |
| 4,643,519 | 2/1987 | Bussard et al. | 350/96.19 |
| 4,652,080 | 3/1987 | Carter et al. | 350/96.19 |
| 4,740,688 | 4/1988 | Edwards | 250/226 |
| 4,778,273 | 10/1988 | Michel | 250/237 G |

Primary Examiner—David C. Nelms
Assistant Examiner—Michael Messinger
Attorney, Agent, or Firm—Christensen, O'Connor, Johnson & Kindness

[57] ABSTRACT

An optical sensor comprising an encoder having a plurality of tracks, and illumination means for illuminating each track with an optical input signal that includes a plurality of wavelength components. Each wavelength component comprises light in a wavelength range different from the wavelength ranges of the other components. Each track includes means for modulating the input signal, and for dispersing the input signal to produce a plurality of spatially dispersed output signals. Each output signal comprises one of the wavelength components. Output signals having different wavelength components from different tracks are combined to produce a composite output signal, such that each wavelength component in the composite output signal is modulated by a different track. The output signal may therefore be demultiplexed to produce information indicating the position of the encoder. The encoder preferably comprises a masked diffraction grating. A second embodiment in which the encoder comprises a prism is also described.

19 Claims, 6 Drawing Sheets fig. 2.

OPTICAL WAVELENGTH DIVISION MULTIPLEXING OF DIGITAL ENCODER TRACKS

FIELD OF THE INVENTION

The present invention relates to optical sensors and, in particular, to an optical sensor that uses wavelength division multiplexing techniques to sense the position of a movable object.

BACKGROUND OF THE INVENTION

Digital encoders or resolvers generate a digital output signal that indicates the position of an object, such as the linear position of a slide or the angular rotation of a shaft. The digital output signal is usually generated by a series of tracks, one track for each bit of the signal. The bit pattern on the tracks can be encoded by conducting/nonconducting strips. For example, a 1 state may be represented by a conducting strip, and a 0 state by a nonconducting strip. The digital code may then be read by an array of electrical wipers, with the conducting strips having a common electrical return.

More recently, optical tracks have been used for encoders, wherein a 1 state is represented for example by a transparent area of the track, and a 0 state by an opaque area of the track. Alternately, reflecting and nonreflecting areas can be used to represent the data. The tracks may be illuminated by individual light sources, e.g., LEDs or incandescent bulbs, or by a common light source. Optical transmission or reflection may be read by a common detector, or by an array having one detector for each track. The detector outputs are converted into a 1 or 0 digital levels by suitable electronics.

The encoder systems described above are all interrogated or read via an electrical interface. Electrical interconnections are vulnerable to EMI and EMP, and, in some instances, electrical power may not be available at the location of the encoder. Therefore, for many applications, an electrically passive encoder, i.e., an encoder that requires neither electrical interconnects for interrogation, nor power for operation, would be desirable. A number of optical encoding systems hve been proposed, including systems based upon optical time domain reflectometry, and systems based upon wavelength division multiplexing. However, in general, such systems have proven to be optically complex and inenfficient, and both difficult and costly to build.

SUMMARY OF THE INVENTION

The present invention provides a wavelength division multiplexed optical sensor that is extremely simple to construct, with the result that the cost and signal losses that arise in a complex, optical system are minimized.

In the preferred emodition, the optical sensor comprises an encoder having a plurality of tracks, and illumination means for illuminating each track with an optical input signal. The input signal includes a plurality of wavelength components, each wavelength component comprising light in a wavelength range different from the wavelength ranges of other wavelength components. Each track includes means for modulating the input signal in one of a plurality of different ways, such that the encoder track can encode information, and means for dispersing the input signal to produce a plurality of spatially dispersed output signals. Each output signal comprises one of the wavelength components.

The sensor further comprises means for combining output signals having different wavelength components from different tracks, to produce a composite output signal. Each wavelength component in the composite output signal is therefore modulated by a different track, and the output signal may thus be demultiplexed to produce information indicating the position of the encoder. In one preferred embodiment, the encoder comprises a diffraction grating, and the tracks comprise side-by-side sections of the grating.

In a second embodiment, the encoder comprises a prism having first and second faces, the second face having a plurality of encoder tracks positioned thereon. A first face of the encoder is illuminated with an optical input signal that includes a plurality of wavelength components, such that the prism disperses the optical input signal to produce a plurality of spatially dispersed signals each of which illuminates a separate track. Each dispersed signal comprises one of the wavelength components. Means are provided for combining the output signals exiting through the tracks on the second face to produce the composite output signal.

DETAILED DESCRIPTION OF THE INVENTION

Figure 1:
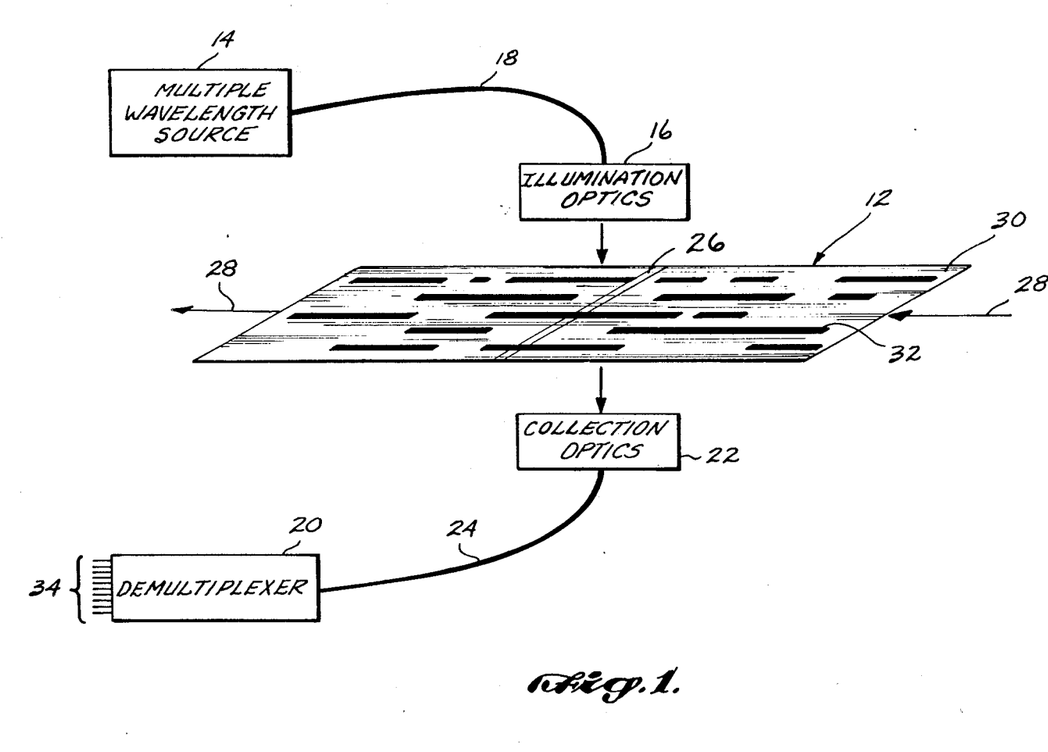
FIG. 1 is a schematic view of a preferred embodiment of the multiplexing system of the present invention.

One preferred embodiment of the present invention is illustrated in schematic form in FIGS. 1-4. Referring initially to FIG. 1, this embodiment includes encoder 12, multiple wavelength source 14, illumination optics 16, demultiplexer 20 and collection optics 22. Source 14 may comprise a broadband source such as an incandescent bulb, or a plurality of discrete sources such as LEDs. Light provided by source 14 is conveyed to illumination optics 16 by fiber-optic cable 18. Illumination optics 16 forms the light into a thin sheet that is projected onto encoder 12, such that the sheet of light illuminates a narrow strip 26 extending cross the width of the encoder.

Movement of the type to be sensed causes encoder 12 to move in a lengthwise movement direction 28, the movement direction being generally perpendicular to strip 26. A portion of the light emitted from strip 26 is received by collection optics 22, and a corresponding optical signal is conveyed to demultiplexer 20 via fiber-optic cable 24. The demultiplexer produces a set of digital signals on lines 34 that indicate the position of encoder 12 relative to the illumination and collection optics. For simplicity of illustration and description, the invention will be described primarily for transmission geometries in which the encoder transmiits light from the illumination optics to the collection optics. However in all embodiments, arrangements in which the encoder reflects light from the illumination optics to the collection optics may also be used.

Encoder 12 comprises a diffraction grating 30 on which a plurality of tracks 32 are superimposed. In the illustrated embodiment, grating 30 is a transmission grating having rulings parallel to movement direction 28 and perpendicular to area 26. Each track 32 comprises an elongated section of the encoder that extends along the lengthwise axis of the encoder, parallel to movement direction 28 and to the diffraction grating rulings. Each track includes a combination of masked (i.e., nontransmissive and/or nondispersive) areas, indicated by dark bars, and unmasked (i.e., transmissive and dispersive) areas. The masked areas of each track may be opaque or nonreflecting, as suggested by the illustration in FIG. 1, or may be portions of the grating on which the dispersive (i.e., ruled) surface has been removed. A suitable ruling density for the grating is 300 lines per track, or about 600 lines/mm.

When an unmasked track area is positioned in illuminated strip 26, that track transmits dispersed light from the illumination optics to collection optics 22. When a masked out area of a track is positioned in illuminated strip 26, no dispersed light is transmitted from that track to the collection optics. Thus each "area" of each track may be used to encode a single binary bit, and at a given position of the encoder, the combination of all tracks encodes a multibit binary word that may be used to indicate the position of encoder 12 with respect to the illumination and collection optics.

Figure 2:
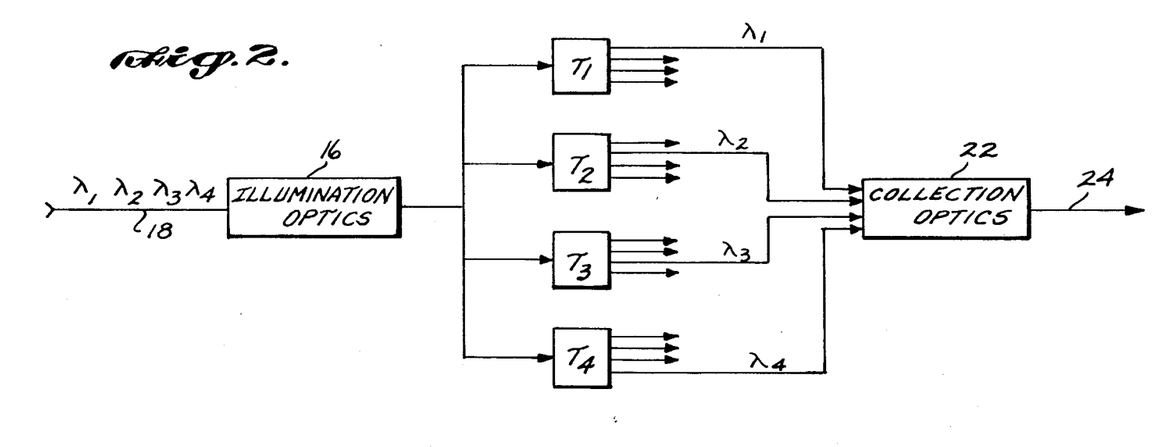
FIG. 2 is a schematic diagram illustrating the operation of the embodiment of FIG. 1.
Figure 3:
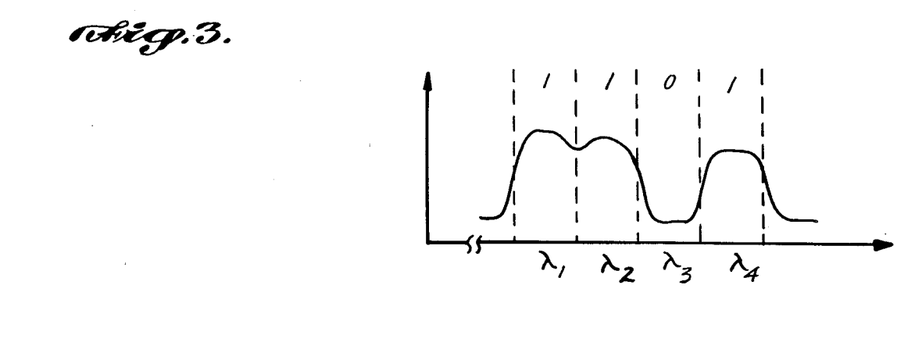
FIG. 3 is a graph illustrating the digital encoding performed by the embodiment of FIGS. 1 and 2.

FIGS. 2 and 3 illustrate the operation of the FIG. 1 embodiment for an encoder that includes four tracks $T_1$-$T_4$. In this case, the broadband light on fiber-optic cable 18 includes wavelength components $\lambda_1$-$\lambda_4$, each wavelength component comprising light in a particular wavelength range. In FIG. 3, the wavelength ranges for wavelength components $\lambda_1$-$\lambda_4$ are shown as being immediately adjacent to one another, although ranges widely separated from one another could also be used. Illumination optics 16 in FIG. 2 distributes the broadband light on fiber-optic cable 18 to each of the four encoder tracks $T_1$-$T_4$. Each encoder track modulates the broadband light, typically in an on/off, transmission/attenuation fashion, and also spatially disperses the light such that the different wavelength components $\lambda_1$-$\lambda_4$ are spatially separated from one another, as indicated by the four arrows emerging from the right-hand side of each encoder track.

Collection optics 22 combines the first wavelength component $\lambda_1$ from track $T_1$, the second wavelength component $\lambda_2$ from track $T_2$, etc., to produce a composite optical signal on fiber-optic cable 24. For the case in which tracks $T_1$, $T_2$ and $T_4$ are transmitting while track $T_3$ is masked out or otherwise attenuates the incident light, the spectral composition of the composite optical signal would be as shown in FIG. 3, the composite signal being "present" in the wavelength ranges corresponding to $\lambda_1$, $\lambda_2$ and $\lambda_4$, and "absent" in the wavelength range corresponding to $\lambda_3$, producing the indicated four-bit digital signal 1101.

Figure 4:
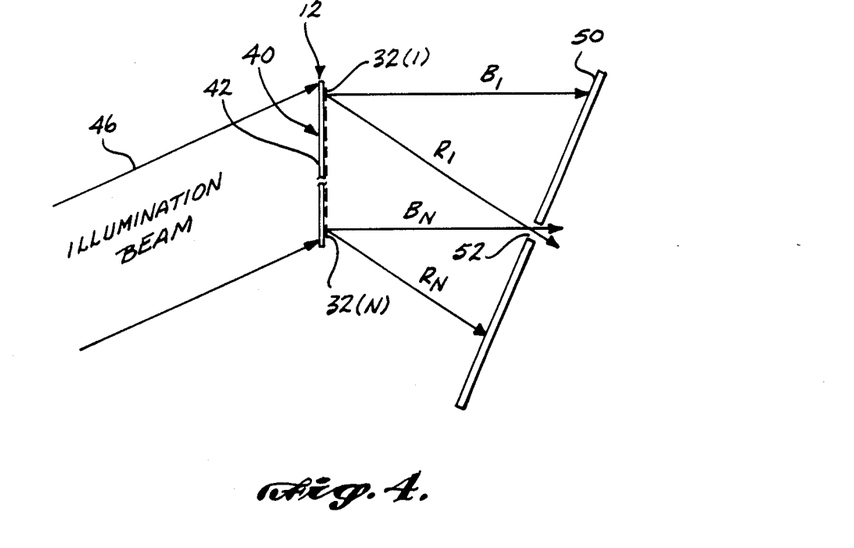
FIG. 4 is a schematic cross-sectional view showing dispersion of the illumination beam by the encoder tracks.

FIG. 4 shows encoder 12 in cross section. The encoder comprises a transmission diffraction grating having rulings that are perpendicular to the plane of the drawing. A total of N tracks 32(1)–32(N) are overlaid onto one surface of the grating, each track comprising an elongated section of the encoder that extends normal to the plane of the figure and that includes a sequence of transmitting and nontransmitting areas. Encoder 12 is illuminated by illumination beam 46, such that a narrow strip of the encoder is illuminated, in the manner shown in FIG. 1. In FIG. 4, illumination beam 46 lies in the plane of the drawing.

Light from illumination beam 46 that is transmitted by track 32(1) is diffracted and dispersed in the plane of the figure, such that for first order diffraction, the longest wavelength component of the illumination beam is diffracted along path $R_1$, and the shortest wavelength component is diffracted along path $B_1$, with intermediate wavelength components following paths that lie between the $R_1$ and $B_1$ paths. In this nomenclature, R symbolizes the longer (e.g., red) wavelengths and B symbolizes the shorter (e.g., blue) wavelengths, although it will be appreciated that light outside the visible range will often be used. In a similar manner, track 32(N) diffracts the longest wavelength components of the illumination beam along path $R_N$, and diffracts the shortest wavelength components along path $B_N$.

Light diffracted by the N tracks strikes aperture plate 50 that includes a small opening or aperture 52. Aperture plate 50 is positioned such that aperture 52 is located at the point in space where the long wavelength rays from encoder track 32(1) intersect the short wavelength rays from encoder track 32(N), e.g., at the point where paths $R_1$ and $B_N$ intersect. Aperture 52 thereby also receives intermediate wavelength components from the tracks between 32(1) and 32(N). Spectral analysis of the composite optical signal passing through aperture 52 thus provides information as to which of encoder tracks 32 are transmitting at any given time. This can be understood by noting that the longest wavelength components of the illumination beam can only reach aperture 52 via path $R_1$, and therefore will be present in the composite output signal only if track 32(1) is transmitting. The shortest wavelength components of illumination beam 46 can only reach aperture 52 via encoder track 32(N), and therefore will be present only if encoder track 32(N) is transmitting. Similar statements apply to intermediate wavelength components and intermediate tracks. Referring again to the embodiment shown in FIG. 1, collection optics 22 may be positioned to simply collect the light passing through aperture 52, and couple such light to demultiplexer 20 via fiber-optic cable 24. Demultiplexer 20 may include any suitable photometric device, such as a monochromator, for spectrally analyzing the light and producing corresponding digital output signals.

As indicated above, the diffraction grating used to implement encoder 12 can be a reflection grating, as well as the illustrated transmission grating. In addition, for either a reflection or transmission grating, an alternate embodiment may be used in which only the "unmasked" portions of the tracks comprise gratings. In particular, for an embodiment of this type utilizing a transmission grating, encoder 12 would comprise a transparent member, and each track would comprise nondispersive portions and portions comprising transmission gratings. Referring to FIG. 4, the nondispersive portions of each track would simply transmit illumination beam 46, with no resulting illumination being produced at aperture 52, while the portions of each track that comprise gratings would diffract the corresponding wavelength component of the illumination beam into aperture 52. A similar arrangement would apply to a reflection geometry.

The size of aperture 52 is a compromise between the light energy loss that can be tolerated, and the degree of separation of the wavelength components from adjacent tracks. Provided the distance between the grating and the aperture plate is large compared to the track width, adjacent components will just be resolved, for collimated illumination, if the aperture width equals the track separation. Greater resolution will be obtained if the aperture width is reduced, but this will be at the expense of the collection efficiency. If converging or diverging illumination is used, the spectral images on aperture plate 50 emanating from the first and last tracks 32(1) and 32(N) will be closer together or further apart, respectively. This arises because the angle of the incident radiation will be a function of the track location on the diffraction grating.

Figure 5:
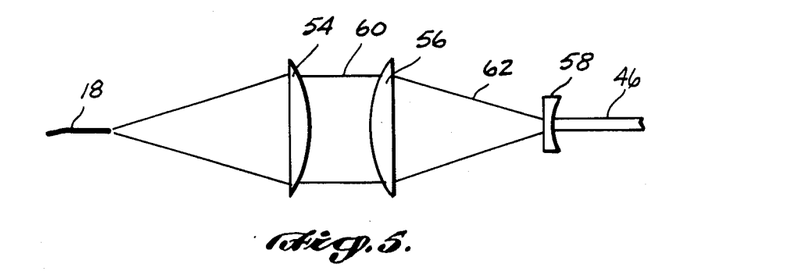
FIGS. 5 and 6 are optical diagrams showing the illumination optics.
Figure 6:
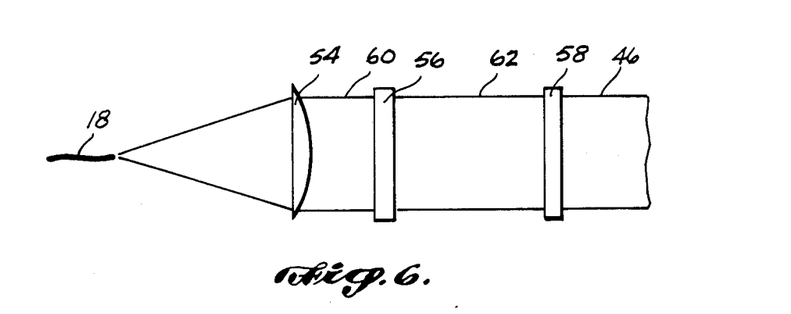

A suitable embodiment for illumination optics 16 is illustrated in FIGS. 5 and 6. The illumination optics comprises a Galilean arrangement that includes collimating lens 54 and cylindrical lenses 56 and 58. Collimating lens 54 is positioned so as to collect light emerging from fiber-optic cable 18, and forms such light into collimated beam 60 that has a circular cross section. Beam 60 impinges on first cylindrical lens 56, and cylindrical lens 56 focuses the beam in one cross-axis direction (normal to the optical axis), to produce beam 62 that is converging along one cross-axis and remains collimated along the second cross-axis. Finally, second cylindrical lens 58 is a cylindrical diverging lens that converts beam 62 into blade shaped illumination beam 46 that is directed onto area 26 of encoder 12. A Keplerian configuration, wherein lens 58 is a converging lens, may also be used.

Figures 7, 8B:
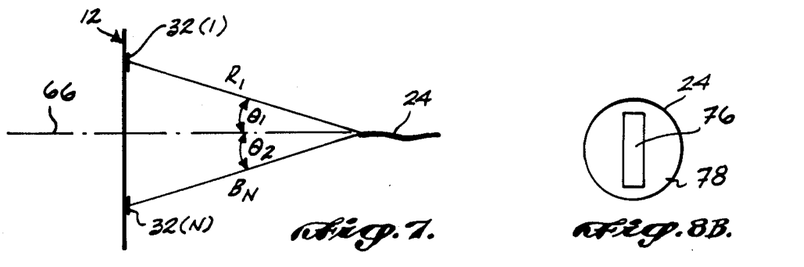
FIG. 7 is an optical diagram of a first preferred embodiment of the collection optics.
FIGS. 8A and 8B comprise an optical diagram of a second preferred embodiment for the collection optics.

One preferred embodiment for collection optics 22 is set forth in FIG. 7. This is a particularly simple arrangement, in which the end of fiber-optic cable 24 serves the function of the aperture. In particular, the end of fiber 24 is placed at the appropriate position for aperture 52, as described above in connection with FIG. 4. In this arrangement, the angles $\theta_1$ and $\theta_2$ between paths $R_1$ and $B_N$ respectively and axis 66 of Fiber-optic cable 24 are preferably less than the numerical aperture of the fiber-optic cable. Furthermore, if fiber-optic cable 24 is relatively short, so that mode mixing does not occur to any appreciable extent, then angles $\theta_1$ and $\theta_2$ are preferably also less than the numerical aperture of the detector in demultiplexer 20. For efficiency, it is also preferred that the thickness of the illumination beam is less than or equal to the diameter of fiber-optic cable 24. Otherwise, part of the available diffracted light will not be collected.

Figure 8A:
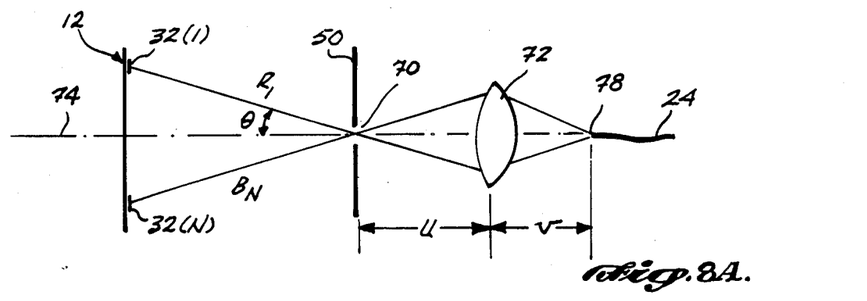

A second embodiment for the collection optics is shown in FIGS. 8A and 8B. The collection optics in this embodiment comprises aperture plate 50 having slit 70 formed therein, slit 70 corresponding to aperture 52 of FIG. 4. Converging lens 72 is placed behind slit 70, lens 72 having an optical axis 74 that extends through the slit and through encoder 12 at a point approximately halfway between tracks 32(1) and 32(N). Lens 72 is placed a distance u from slt 70, and a distance v from the end of fiber-optic cable 24. Referring to FIG. 8B, lens 72 projects a reduced image 76 of slit 70 onto end 78 of fiber-optic cable 24. This arrangement is suitable if the numerical aperture of fiber-optic cable 24 is large, and if the angle between the first and last tracks subtended by the aperture is small. As in the embodiment of FIG. 7, the light incident on the end of the fiber-optic cable should not exceed the numerical aperture of the fiber-optic cable/detector combination, or, quantitatively $$\theta \cdot \mu / v = \text{N.A.} \qquad (1)$$

where the distances u and v are as shown in FIG. 8A.

Figure 9:
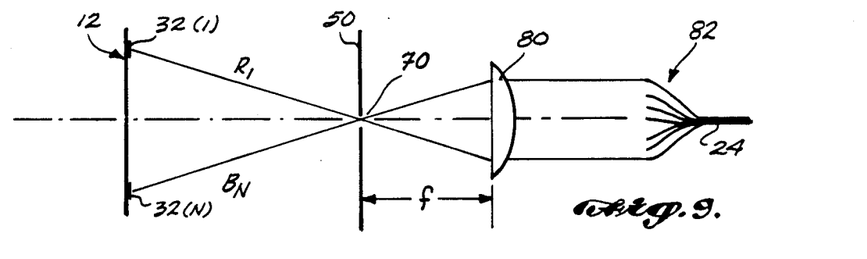
FIG. 9 is an optical diagram showing a third preferred embodiment for the collection optics.

The numerical aperture limitation for the fiber-optic cable may be overcome by imaging the diffracted image of the source onto an array of fibers or optical waveguides. For example in FIG. 9, light passing through slit 70 is focused by lens 80 onto star coupler 82 that is in turn coupled to fiber-optic cable 24. The distance between lens 80 and slit 70 is equal to the focal length f of lens 80. As a result, the light incident on star coupler 82 is collimated, and a reduced diffracted image of the source is projected into fiber-optic cable 24 through the star coupler, thus maximizing the collection efficiency. The fibers in star coupler 82 preferably have diameters smaller than the diameter of fiber-optic cable 24. Thus an optical waveguide combiner with unequal input and output guides could be used instead of the star coupler.

Figure 10:
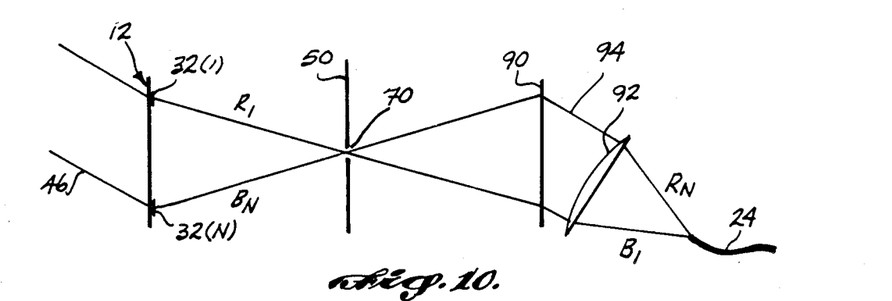
FIG. 10 is an optical diagram showing a fourth preferred embodiment for the collection optics.

A fourth embodiment for the collection optics is shown in FIG. 10. This embodiment uses recombination diffraction grating 90 and lens 92 positioned between slit 70 and fiber-optic cable 24. Grating 90 is parallel to encoder 12, and is positioned an equal distance from aperture plate 50 as the encoder. The result is that grating 90 produces collimated beam 94 that is focused by lens 92 onto the end of fiber-optic cable 24.

Figure 11:
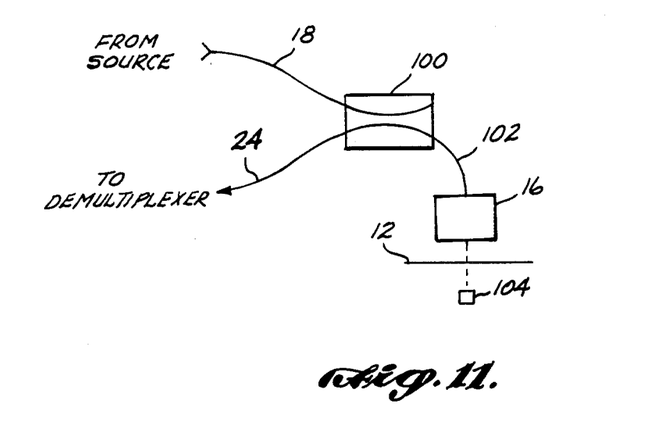
FIG. 11 is an optical diagram showing a fifth preferred embodiment for the collection optics.

A fifth embodiment for the collection optics is shown in FIG. 11. In this embodiment, directional coupler 100 is used to couple light from the broadband source on fiber-optic cable 18 to intermediate fiber-optic cable 102 that is connected to illumination optics 16. A small retroreflector 104 is positioned on the opposite side of encoder 12 from the illumination optics, retroreflector 104 being positioned at a point corresponding to aperture 52 shown in FIG. 4. Retroreflector 104 is preferably selected to have a small reflected beam displacement, and to have the same thickness as the illumination beam. The rays diffracted by encoder 12 retrace their incident paths, and are launched back into fiber-optic cable 102. Return illumination is couple from fiber-optic cable 102 to fiber-optic cable 24 via directional coupler 100, and coupled by fiber-optic cable 24 to the demultiplexer. This arrangement has the advantage of being very efficient optically.

In general, the optical efficiency E, defined as the spectral power density in the spectral range corresponding to one of the tracks divided by the spectral power density in the same wavelength range emerging from the illuminating fiber, is given by $$E = I \cdot G \cdot 1 / N^2 \cdot B \cdot C \qquad (2)$$

where I is the fraction of the light emerging from the illumination fiber that actually falls on area 26, G is the fraction of the light incident on the diffraction grating that is diffracted into the appropriate diffraction order, N is the number of tracks, B is a guard band factor (less than 1), and C is the fraction of diffracted light passing through the aperture that is launched into the return fiber. The $1/N^2$ term arises because $1/N$ of the incident illumination falls on each track, and $(1/N) \times B$ of the diffracted light from each track passes through the aperture. Assuming that I and C are equal to 0.9, G is equal to 0.5, and B is equal to 0.75, the system loss for an 8-bit encoder will be 0.0047, or $-23$ dB. This loss compares favorably with losses found in more complicated wavelength division multiplexing digital sensors.

Figure 12:
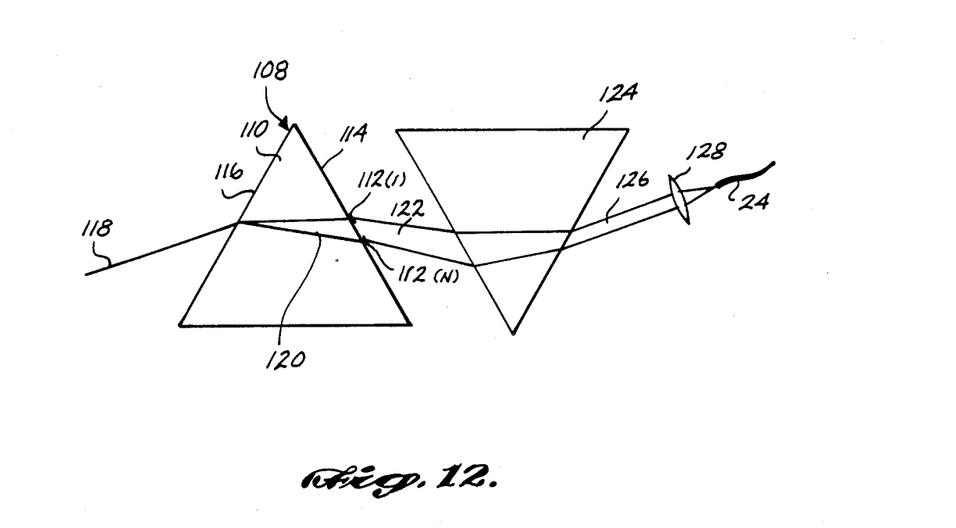
FIG. 12 is an optical diagram of a second principal embodiment of the invention, wherein an encoder mask is positioned directly on a dispersive element.

A second embodiment of the invention is shown in FIG. 12. In this embodiment, the dispersive element is a prism, and the digital tracks cover one face of the prism. The encoder 108 of this embodiment comprises triangular prism 110 that includes N tracks 112(1) through 112(N) on one of its faces 114, the tracks extending into and out of the plane of the drawing. Prism 110 is illuminated on a second face 116 by a thin collimated, multiple wavelength beam 118, such that the dispersed beam 120 illuminates tracks 112. Track 112(1) is positioned to intercept the shortest wavelength light emerging from the prism, while track 112(N) is positioned to intercept the longest wavelength light from the prism. The resulting diverging beam 122 is recombined by a second prism 124 having dimensions equal to prism 110, and the resulting collimated beam 126 is collected by lens 128 and launched into return fiber 24.

Figure 13:
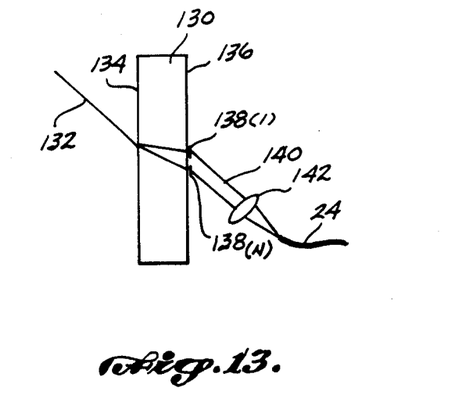
FIG. 13 shows a variation of the FIG. 12 embodiment.

FIG. 13 shows a variation of the embodiment of FIG. 12 in which a rectangular prism 130 is used as the dispersive element. Multiple wavelength illumination beam 132 strikes one face 134 of prism 130, and the opposite face 136 contains the encoder tracks 138(1) through 138(N). Light emerges from the tracks as a collimated beam 140 that is focused by lens 142 onto return fiber 24. In this case, because faces 134 and 136 are parallel, the exiting beam 140 is dispersed but parallel, and thus means are not required for recombining the beam. The displacement of the long and short wavelength beams could be increased by making the right-hand face 136 relecting, and placing the encoder tracks on the left-hand face where the dispersed rays would exit. The tracks could also of course be reflecting rather than transmitting. One advantage of using prisms as dispersion elements is that the optical efficiency is very high.

Figure 14:
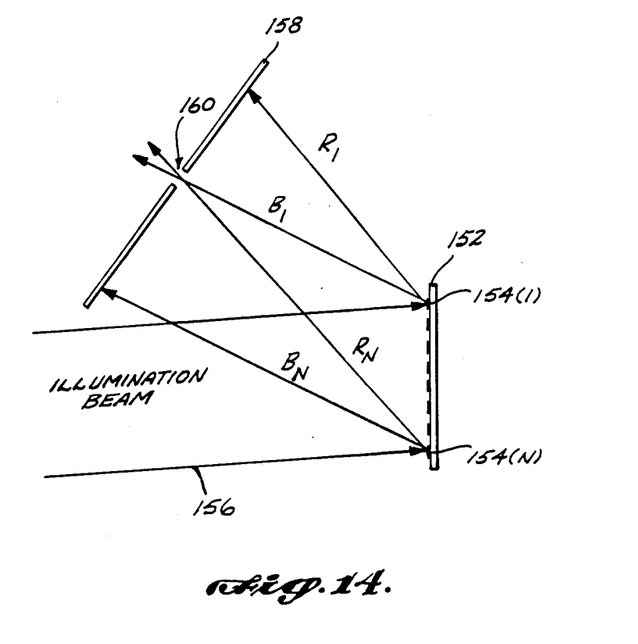
FIG. 14 is a schematic cross-sectional view showing an embodiment using a reflection grating.

While the preferred embodiments of the invention has been illustrated and described, variations will be apparent to those skilled in the art. For example, in the embodiments described above, optical signals are transmitted to and received from the site of the encoder by fiber-optic cables, thus producing an electrically passive sensor, i.e., a sensor that uses no electrical signals at the encoder site. However, the invention is not limited to passive sensors. In particular multiple wavelength source 14 and demultiplexer 20 may be located at the site of the encoder, to provide an improved nonpassive sensing system. In adition, while the invention has been described in terms of linear encoders, it is equally applicable to rotary encoders, wherein the tracks comprise a set of concentric rings, and the diffraction grating comprises a concentric set of rulings or a single helical ruling. In addition, as described above, the invention may be implemented using a reflection geometry, as shown in FIG. 14. In this arrangement, encoder 152 comprises a reflection diffraction grating that includes tracks 154(1) through 154(N). Encoder 152 is illuminated by illumination beam 156, to produce reflected and diffracted light represented by rays $B_1$, $R_1$, $B_N$ and $R_N$, these symbols having meanings identical to those described above in connection with FIG. 4. Aperture plate 158 containing aperture 160 is placed to receive the reflected, difracted light, with aperture 160 being positioned at the intersection of rays $B_1$ and $R_N$. Other features of the reflection system operate as described above in connection with the transmission embodiment.

The embodiments of the invention in which an exclusive property or privilege is claimed are defined as follows:

1. An optical sensor, comprising:
an encoder having a plurality of tracks;
illumination means for illuminating each track with an optical input signal that includes a plurality of wavelength components, each wavelength component comprising light in a wavelength range different from the wavelength ranges of other wavelength components;
each track including means for modulating the input signal in one of a plurality of different ways such that the track can encode information, and for dispersing the input signal to produce a plurality of spatially dispersed output signals, each output signal comprising one of the wavelength components; and,
means for combining output signals having different wavelength components from different tracks to produce a composite output signal, whereby each wavelength component in the composite output signal is modulated by a different track.

2. The sensor of claim 1, wherein the encoder comprises a diffraction grating.

3. The sensor of claim 2, wherein the tracks comprise a plurality of side-by-side sections of the diffraction grating.

4. The sensor of claim 2 wherein the means for modulating the input signal comprises means for selectively causing areas of the grating to be nondispersive.

5. The sensor of claim 2, wherein the grating is a transmission grating.

6. The sensor of claim 5, wherein the means for modulating the input signal comprises means for selectively causing areas of the transmission grating to be nontransmissive.

7. The sensor of claim 2, wherein the grating is a reflection grating.

8. The sensor of claim 7, wherein the means for modulating the input signal comprises means for selectively causing portions of the reflection grating to be nonreflective.

9. The sensor of claim 1, wherein the means for combining the output signals comprises an aperture positioned so as to receive said output signals.

10. The sensor of claim 1, wherein the means for combining the output signals comprises an aperture plate having an aperture formed therein, the aperture plate being positioned such that the output signals combined to produce the composite output signal pass through the aperture.

11. Th sensor of claim 10, wherein the means for combining output signals further comprises a lens positioned to receive light passing through the aperture and to focus said light to produce the composite outputsignal.

12. The sensor of claim 11, further comprising a fiber-optic cable for receiving the composite output signal, wherein said lens focuses the output signals into an end of the fiber-optic cable.

13. The sensor of claim 10, wherein the means for combining the output signals comprises a diffraction grating positioned to receive light that has passed through the aperture and to form such light into a collimated beam, and a lens for focusing the collimated beam into an end of a fiber-optic cable.

14. The sensor of claim 1, wherein the means for combining the output signals comprises a star coupler.

15. The sensor of claim 1, wherein the illumination means comprises a multiple wavelength optical source for producing the optical input signal and an input fiber-optic cable for conveying the optical input signal to a site at which the encoder is located, and wherein the sensor further comprises a demultiplexer for demultiplexing the composite output signal and an output fiber-optic cable for conveying the composite output signal from said site to the demultiplexer, whereby the sensor is electically passive at said site.

16. An optical sensor, comprising:
  an encoder comprising a prism having first and second faces, the second face having a plurality of tracks positioned thereon, the tracks comprising a plurality of parallel sections of the second face, each track including means for modulating an optical input signal in one of a plurality of different ways to produce an optical output signal, such that the track can encode information;
  illumintion means for illuminating the first face with an optical input signal that includes a plurality of wavelength components, each wavelength component comprising in a wavelength range different from the wavelength ranges of the other wavelength components, the optical input signal being directed onto the first face such that the prism disperses the optical input signal to produce a plurality of spatially dispersed signals within the prism each of which illuminates a separate track to produce a corresponding output signal, each dispersed signal comprising one of the wavelength components; and,
  means for combining the output signals exiting through the tracks on the second face to produce a composite output signal.

17. The sensor of claim 16, wherein the prism has a triangular cross section.

18. The sensor of claim 17, wherein the means for combining the output signals comprises a collection prism for receiving the output signals and converting them into collimated beam.

19. The sensor of claim 16, wherein the prism as a rectangular cross section.

* * * * *

UNITED STATES PATENT AND TRADEMARK OFFICE
CERTIFICATE OF CORRECTION

PATENT NO. : 4,849,624

DATED : July 18, 1989

INVENTOR(S) : Raymond W. Huggins

It is certified that error appears in the above-identified patent and that said Letters Patent is hereby corrected as shown below:

Column 1, line 44, "hve" should be --have--

Column 1, line 48, "inenfficient" should be --inefficient--

Column 3, line 1, "cross" should be --across--

Column 3, line 14, "transmiits" should be --transmits--

Column 5, line 55, "Fiber-optic" should be --fiber-optic--

Column 6, lines 16-18, "0 $\mu/v$ = N.A." should be --0 $\mu/v$ < N.A.--

Column 6, line 56, "couple" should be --coupled--

Column 7, line 45, "relecting" should be --reflecting--

Column 7, line 62, "adition" should be --addition--

Column 9, lines 1 and 2, "outputsig-nal" should be --output signal--

Column 9, line 24, "electically" should be --electrically--

Column 10, line 5, "illumintion" should be --illumination--

Column 10, line 8, after "comprising" insert --light--

Signed and Sealed this

Tenth Day of July, 1990

Attest:

HARRY F. MANBECK, JR.

*Attesting Officer*      *Commissioner of Patents and Trademarks*